US010433119B2

(12) United States Patent
Ishiyama

(10) Patent No.: US 10,433,119 B2
(45) Date of Patent: Oct. 1, 2019

(54) POSITION DETERMINATION DEVICE, POSITION DETERMINING METHOD, AND STORAGE MEDIUM

(71) Applicant: NEC Corporation, Minato-ku, Tokyo (JP)

(72) Inventor: Rui Ishiyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/562,470

(22) PCT Filed: Apr. 8, 2016

(86) PCT No.: PCT/JP2016/061475
§ 371 (c)(1),
(2) Date: Sep. 28, 2017

(87) PCT Pub. No.: WO2016/163492
PCT Pub. Date: Oct. 13, 2016

(65) Prior Publication Data
US 2018/0098200 A1 Apr. 5, 2018

(30) Foreign Application Priority Data
Apr. 10, 2015 (JP) ................. 2015-080629

(51) Int. Cl.
H04W 4/02 (2018.01)
H04W 4/04 (2009.01)
(Continued)

(52) U.S. Cl.
CPC ............... *H04W 4/04* (2013.01); *G05D 1/02* (2013.01); *G05D 1/0246* (2013.01);
(Continued)

(58) Field of Classification Search
CPC ...... H04N 9/3129; H04N 5/2224; G05D 1/02; G05D 1/0274; G01C 21/20
(Continued)

(56) References Cited

U.S. PATENT DOCUMENTS 5,525,883 A * 6/1996 Avitzour .............. G05D 1/0274
318/568.1
7,548,272 B2 * 6/2009 Perlman ............... H04N 5/2224
348/169
(Continued)

FOREIGN PATENT DOCUMENTS

JP   H03-90309 U   9/1991
JP   H08-178654 A  7/1996
(Continued)

OTHER PUBLICATIONS

International Search Report for PCT Application No. PCT/JP2016/061475, dated May 31, 2016.
(Continued)

*Primary Examiner* — William D Cumming

(57) ABSTRACT

A position determining device is equipped with a matching unit. The matching unit matches a random pattern in a photographed image of a portion of a ceiling or floor photographed by a portable terminal against a random pattern in a photographed image of a larger area of the ceiling or floor than the aforementioned portion so as to determine the position of the photographed image of the aforementioned portion on the photographed image of the larger area. The matching unit determines the position of the ceiling located above the portable terminal or the position of the floor located therebelow on the basis of the identified position on the photographed image of the larger area.

2 Claims, 15 Drawing Sheets

(51) Int. Cl.
*G05D 1/02* (2006.01)
*G06K 9/46* (2006.01)
*G06K 9/52* (2006.01)
*G06K 9/62* (2006.01)
*G06T 7/60* (2017.01)
*G06K 9/32* (2006.01)
*G06T 7/73* (2017.01)
*H04W 4/33* (2018.01)
*G06K 9/00* (2006.01)
*G01C 21/20* (2006.01)
*G06K 9/36* (2006.01)

(52) U.S. Cl.
CPC ....... *G05D 1/0274* (2013.01); *G06K 9/00691* (2013.01); *G06K 9/3216* (2013.01); *G06K 9/4609* (2013.01); *G06K 9/52* (2013.01); *G06K 9/6202* (2013.01); *G06T 7/60* (2013.01); *G06T 7/74* (2017.01); *H04W 4/02* (2013.01); *H04W 4/33* (2018.02); *G01C 21/206* (2013.01); *G05D 2201/0215* (2013.01); *G06K 2009/363* (2013.01)

(58) Field of Classification Search
USPC ............. 348/48, 371, 207.99; 455/456.1; 318/568.1
See application file for complete search history.

(56) References Cited

U.S. PATENT DOCUMENTS

| | | | | |
|---|---|---|---|---|
| 7,567,293 B2* | 7/2009 | Perlman | ............... | H04N 5/2224 348/207.99 |
| 7,667,767 B2* | 2/2010 | Perlman | ............... | G06T 1/0007 345/473 |
| 8,207,963 B2* | 6/2012 | Cotter | ............... | G06T 7/20 345/419 |
| 9,582,516 B2* | 2/2017 | McKinnon | ............... | G06F 16/5866 |
| 9,817,848 B2* | 11/2017 | McKinnon | ............... | G06F 16/5866 |
| 2007/0285514 A1* | 12/2007 | Perlman | ............... | H04N 5/2224 348/169 |
| 2007/0285559 A1* | 12/2007 | Perlman | ............... | H04N 5/2224 348/371 |
| 2007/0285560 A1* | 12/2007 | Perlman | ............... | G06T 1/0007 348/371 |
| 2009/0147224 A1* | 6/2009 | Kurozuka | ............... | H04N 9/3129 353/98 |
| 2009/0174701 A1* | 7/2009 | Cotter | ............... | G06T 7/20 345/419 |
| 2010/0231692 A1* | 9/2010 | Perlman | ............... | G06F 3/005 348/48 |
| 2015/0109338 A1* | 4/2015 | McKinnon | ............... | G06F 16/5866 345/633 |
| 2017/0132253 A1* | 5/2017 | McKinnon | ............... | G06F 16/5866 |
| 2018/0046648 A1* | 2/2018 | McKinnon | ............... | G06F 16/5866 |
| 2018/0098200 A1* | 4/2018 | Ishiyama | ............... | G05D 1/02 |

FOREIGN PATENT DOCUMENTS

| | | |
|---|---|---|
| JP | 2004-133567 A | 4/2004 |
| JP | 2004-288148 A | 10/2004 |
| JP | 2011-210183 A | 10/2011 |

OTHER PUBLICATIONS

English translation of Written opinion for PCT Application No. PCT/JP2016/061475.

* cited by examiner

POSITION DETERMINATION DEVICE, POSITION DETERMINING METHOD, AND STORAGE MEDIUM

This application is a National Stage Entry of PCT/JP2016/061475 filed on Apr. 8, 2016, which claims priority from Japanese Patent Application 2015-080629 filed on Apr. 10, 2015, the contents of all of which are incorporated herein by reference, in their entirety.

TECHNICAL FIELD

The present invention relates to a position determination device, a position determining method, and a program.

BACKGROUND ART

As a system for determining a user position, for example, a system for detecting the user position by exchanging positional information via a radio wave/optical beacon or the like is known. However, when the user position is determined at indoor, there has been a problem of an extremely high infrastructure costs to install a large number of radio waves/optical beacons or the like.

For example, PTL1 discloses a mobile object that includes a camera for capturing image of ceiling surface, stores an image of ceiling that is captured in advance together with the positional information as teaching image information, compares the teaching image information with the captured image, and detects a position of the mobile object.

CITATION LIST

Patent Literature

[PTL1] Japanese Unexamined Patent Publication No. 2004-133567

SUMMARY OF INVENTION

Technical Problem

In the above PTL1, a technique of comparing a teaching image with the captured image using a feature portion provided to a ceiling is disclosed. As a feature portion of the ceiling, for example, a blowout port of an air conditioner, a corner of a ceiling panel and the like are assumed. However, on the ceiling of the wide office or the like, there are many portions where the blowout port of the air conditioner, the corner of the ceiling panel and the like are provided in the similar manner, and thus, it is difficult to obtain a correct comparison result in the invention disclosed in PTL1.

The present invention is made in view of the above described problems, and an object of the present invention is to provide a position determination device, a position determining method, and a program that can determine a user position more correctly using an image of a ceiling or a floor.

Solution to Problem

The present invention includes a position determination device including: a comparison unit that is configured to compare a random pattern of an image of a partial area of a ceiling or a floor, the image being captured by a mobile terminal, with a random pattern of an image of an extensive area of the ceiling or the floor, the extensive area of the ceiling or the floor being more wider than the partial area of the ceiling or the floor; determine a position of the image of the partial area in the image of the extensive area, and determine the position on the ceiling above the mobile terminal or the position on the floor below the mobile terminal based on the determined position on the image of the extensive area.

The present invention includes a position determining method including: comparing a random pattern of an image of a partial area of a ceiling or a floor, the image being captured by a mobile terminal, with a random pattern of an image of an extensive area of the ceiling or the floor, the extensive area of the ceiling or the floor being more wider than the partial area of the ceiling or the floor; determining a position of the image of the partial area in the image of the extensive area; and determining the position on the ceiling above the mobile terminal or the position on the floor below the mobile terminal based on the determined position on the image of the extensive area.

The present invention includes a program causing a computer to execute the comparison processes of: comparing a random pattern of an image of a partial area of a ceiling or a floor, the image being captured by a mobile terminal with a random pattern of an image of an extensive area of the ceiling or the floor, the extensive area of the ceiling or the floor being more wider than the partial area of the ceiling or the floor; determining a position of the image of the partial area in the image of the extensive area; and determining the position on the ceiling above the mobile terminal and the position on the floor below the mobile terminal based on the determined position on the image of the extensive area.

Advantageous Effects of Invention

According to the present invention, the user position can be determined more correctly using the image of the ceiling or the floor.

DESCRIPTION OF EMBODIMENTS

First Example Embodiment

A first example embodiment of the present invention is described.

Figure 1:
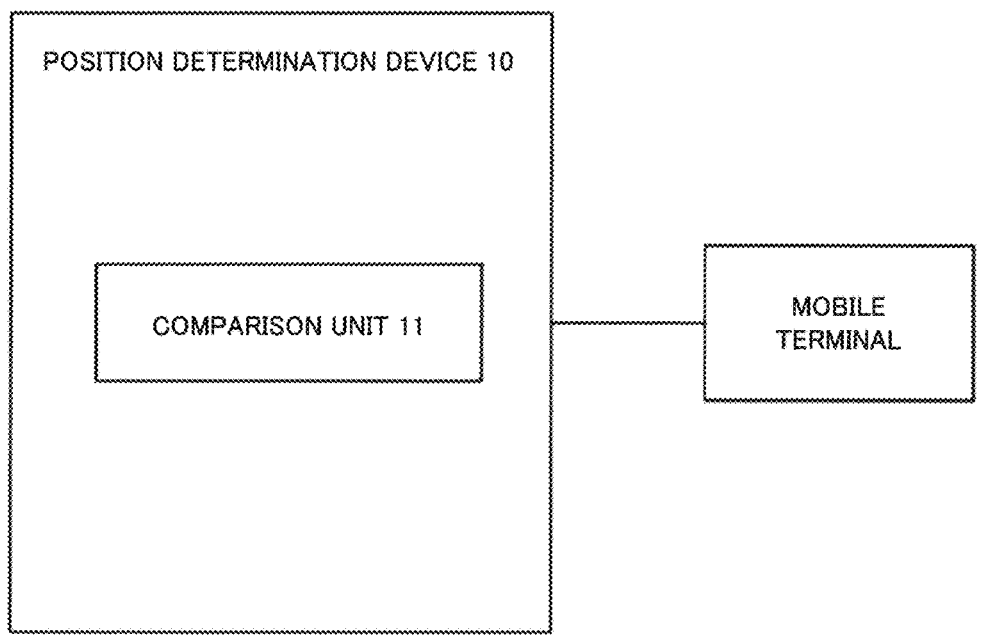
FIG. 1 is a block diagram of a first example embodiment.

FIG. 1 is the block diagram of the first example embodiment of the present invention.

The first example embodiment of the present invention is a position determination device 10 including a comparison unit 11 that compares a random pattern of an image of a partial area of a ceiling or a floor which image is captured by a mobile terminal with a random pattern of a captured image of an area of the ceiling or the floor of which area is more wider than the partial area of the ceiling or the floor, determines a position of the captured image of the partial area in a captured image of an extensive area, and based on a determined position in the captured image of the extensive area, determines a position on the ceiling above the mobile terminal and a position on the floor below the mobile terminal.

Upon receiving, from the mobile terminal, the captured image of the partial area of the ceiling or the floor, the comparison unit 11 compares image features of the random pattern of the captured image of the partial area of the ceiling or the floor with image features of the random pattern of the captured image of the more extensive area of the ceiling or the floor, and determines a position of an image of the partial area in the captured image of the extensive area. The comparison unit 11, based on the determined position on the captured image of the extensive area, notifies the position of the mobile terminal.

Figure 2:
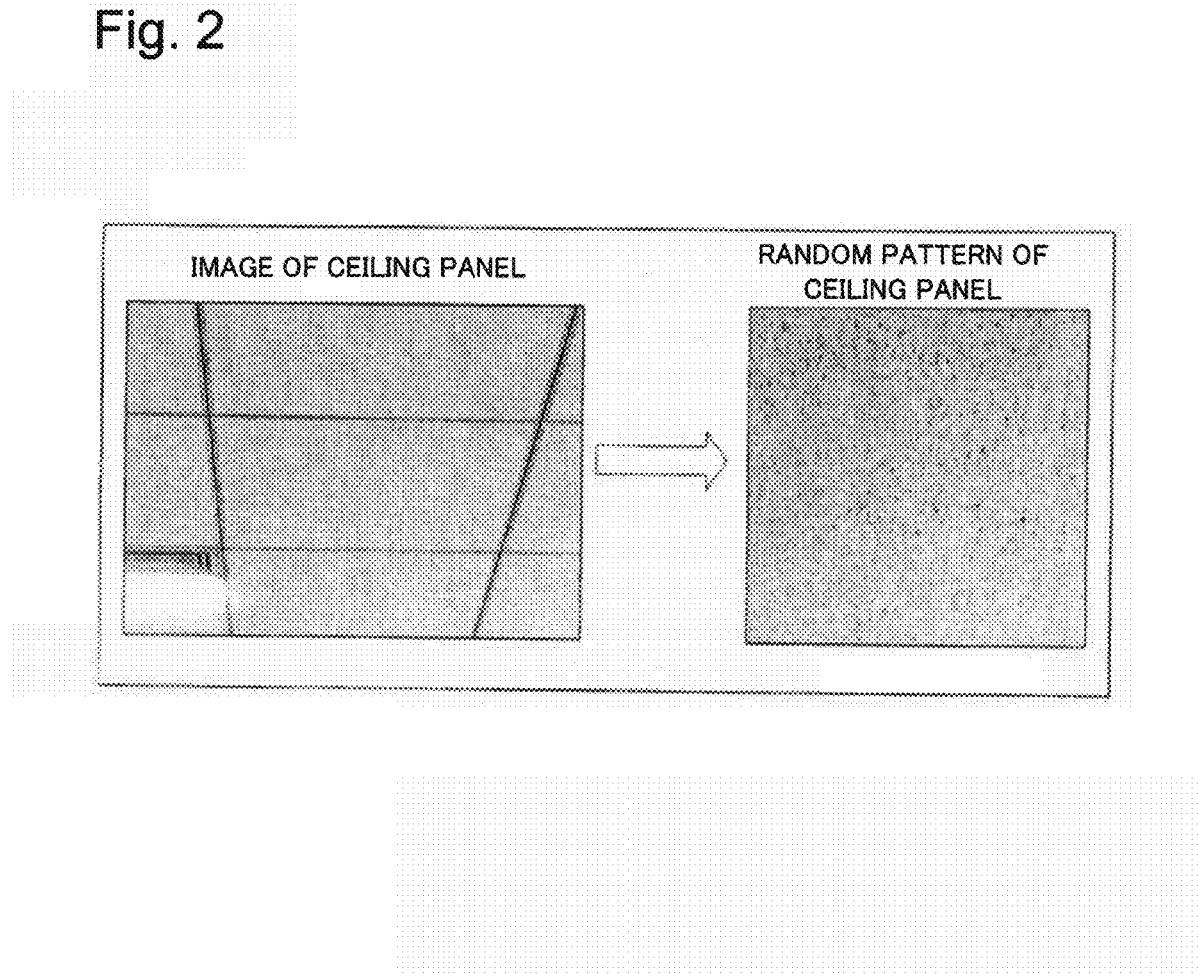
FIG. 2 is a diagram exemplifying a random pattern shown from an image of the ceiling panel.

The random pattern corresponds to an irregular pattern of a surface of the ceiling or the floor. For example, FIG. 2 illustrates an example of the random pattern obtained from the captured image of the ceiling panel. The random pattern includes not only a pattern applied as a design and a pattern formed for soundproofing purpose, and a chemical protective and thermal insulation purpose, but also a pattern originally formed in a ceiling material or a flooring material. The random pattern further includes a painting causing a random irregularity on a surface. In the painting, a surface that is painted using a coating material including different clays and a coating material mixed with solid particles, and a surface that is painted by coating processes such as hammer nets and hammer tons are included. The painting also includes a case of forming a satin pattern by applying sandblasting on a painted surface.

The mobile terminal is a terminal that includes an imaging unit such as a camera, a communication unit, and a display unit, and includes a smartphone and a tablet. Further, the mobile terminal includes a memory and a CPU and performs various types of processing described later by executing a program stored in the memory.

The partial area of the ceiling or the floor imaged by the mobile terminal corresponds to an area in the ceiling above a self-position or an area in the floor below the self-position. Any range may be used as an imaging range of a comparison area, but the imaging range of the comparison area is preferably a range enabling an extraction of feature points needed for determining the position or more.

The image (map), captured by the mobile terminal, of the area of the ceiling or the floor which area is more extensive than the partial area of the ceiling or the floor, may be obtained by capturing a high-resolution image at a wide angle, may be formed by combining a plurality of captured images of the ceiling or the floor, and may be formed by use of an image mosaicking technique.

Figure 3:
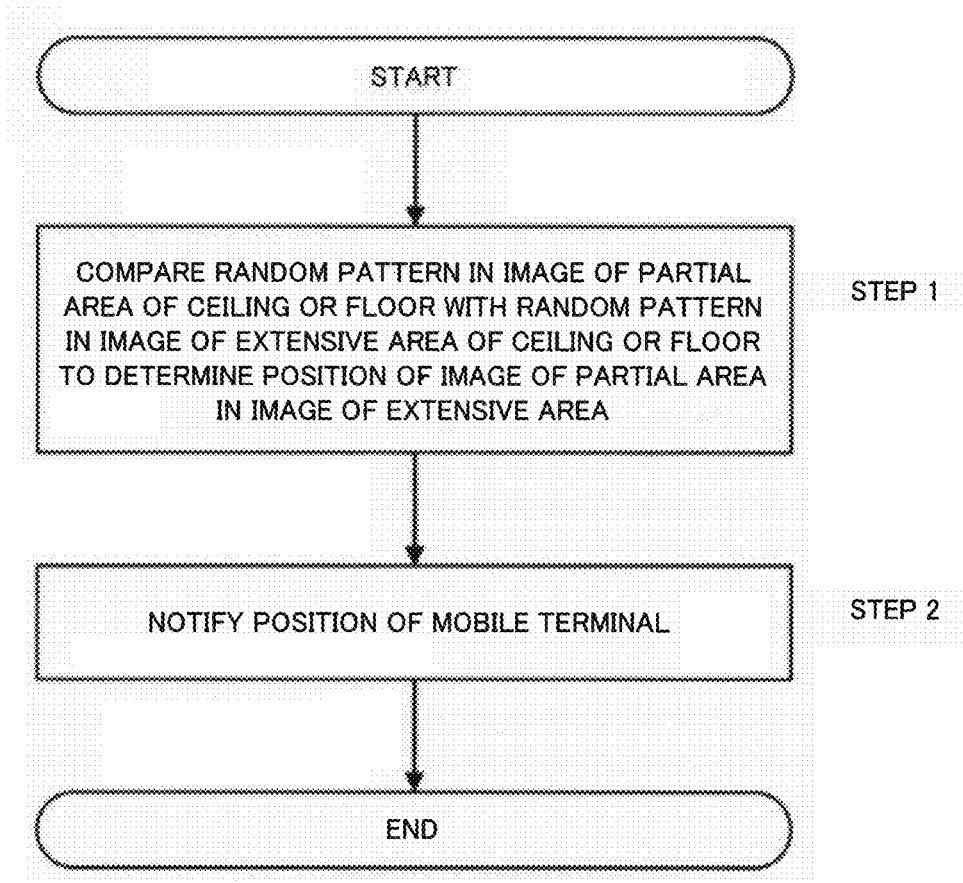
FIG. 3 is a flowchart explaining operations of the position determination device in the first example embodiment.

Next, operations of the position determination device 10 according to the first example embodiment are described with reference to the flowchart of FIG. 3.

The comparison unit 11 receives the random pattern of the image of the partial area of the ceiling or the floor which image is captured by the mobile terminal. The comparison unit 11 compares the received random pattern of the captured image with the random pattern of the captured image of the area of the ceiling or the floor, which area is more extensive than the partial area of the ceiling or the floor. The comparison unit 11 determines, based on a comparison result, a position of the captured image of the partial area in the captured image of the extensive area (step 1).

The determined position of the captured image of the partial area in the captured image of the extensive area is a position on the ceiling above the mobile terminal that captures an image, or a position on the floor below the mobile terminal. The comparison unit 11 notifies a position determined at step 1 to a predetermined notification destination as a position of the mobile terminal (step 2).

Figure 4:
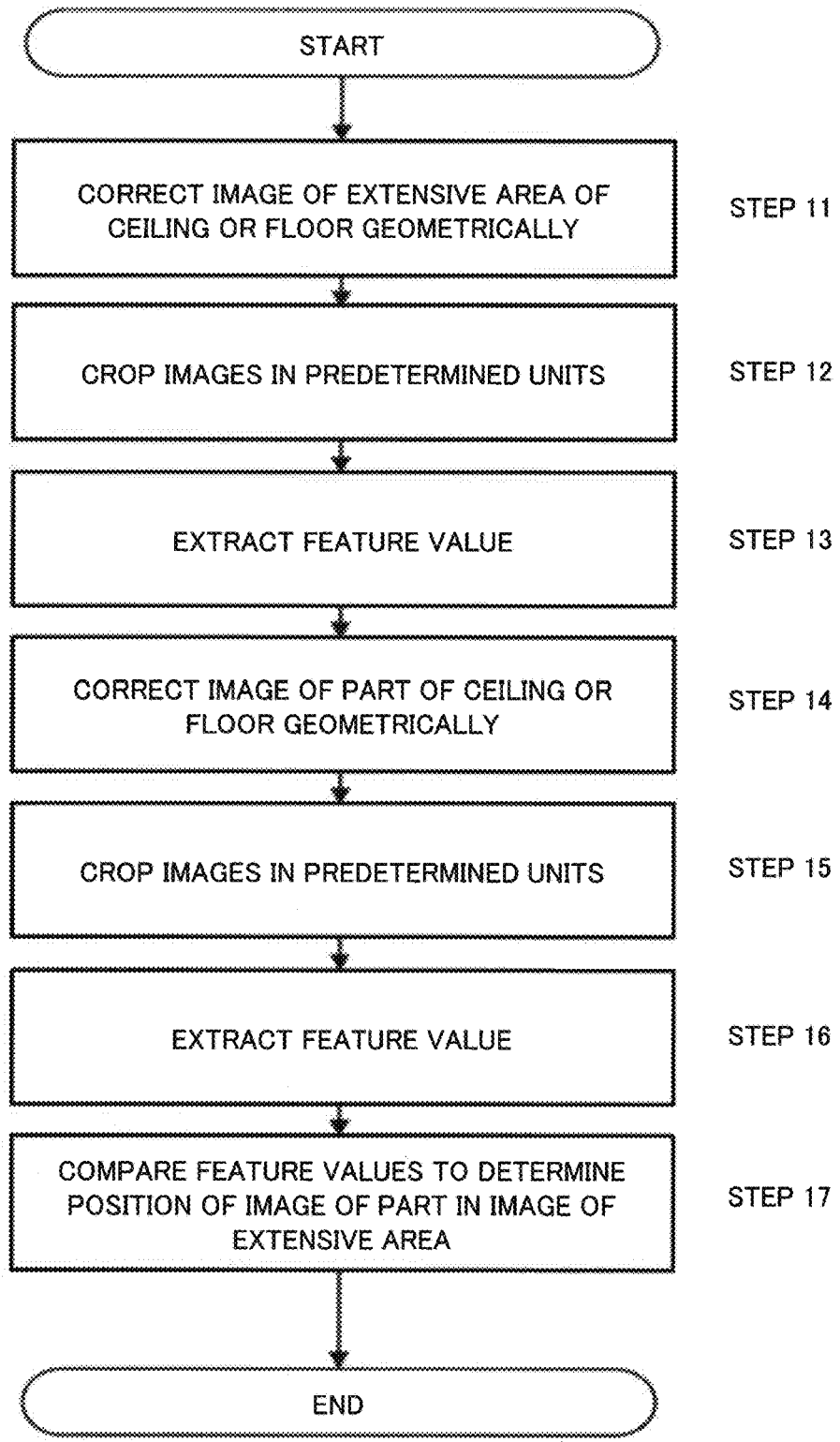
FIG. 4 is a diagram explaining comparison processes of the captured image.

The comparison processes of the captured image at step 1 above are described with reference to the flowchart of FIG. 4.

The comparison unit 11 performs a geometric correction on the captured image of the extensive area of the ceiling or the floor (step 11). In the process, a slope is corrected because when a wide range of the ceiling and the floor is captured at a wide angle, the captured image slopes. The comparison unit 11 may detect a line of the ceiling panel or the floor panel to correct the image using the line. For the geometric correction, for example, a Homography transformation, a measurement value of a G sensor or the like may be employed.

The image processing of emphasizing a local contrast may be performed on a geometrically corrected image.

The comparison unit 11 crops an image in a predetermined unit from the geometrically corrected image of the extensive area of the ceiling or the floor (step 12). The comparison unit 11 extracts (for example, keypoint descriptor extracting) a feature value from each of the cropped images (step 13). The image may be cropped in any unit and for example, a panel unit and a predetermined size unit may be used.

Further, the comparison unit 11 performs the geometric correction on the captured image of the partial area of the ceiling or the floor (step 14). When a portion right above the self-position or a portion right below the self-position is captured, the captured image slopes, and thus the slope is corrected.

The comparison unit 11 crops an image from the geometrically corrected image of a part of the ceiling or the floor (step 15), and extracts (for example, keypoint descriptor extracting) a feature value from the cropped image (step 16). Any range of image may be cropped, but since a range of the cropped image is narrow. For example, an image of narrow range such as right above the self-position of the mobile terminal or a range right below the self-position is cropped, therefore, a range is desirably a range enabling an extraction of the feature point needed for comparison, such as an area of one panel.

The comparison unit 11 compares the feature value obtained from the captured image of a part of the ceiling or the floor with the feature value obtained from the captured image of the extensive area of the ceiling or the floor, and determines a position of an image of a part of the ceiling or the floor in the captured image of the extensive area of the ceiling or the floor (step 17).

Figure 5:
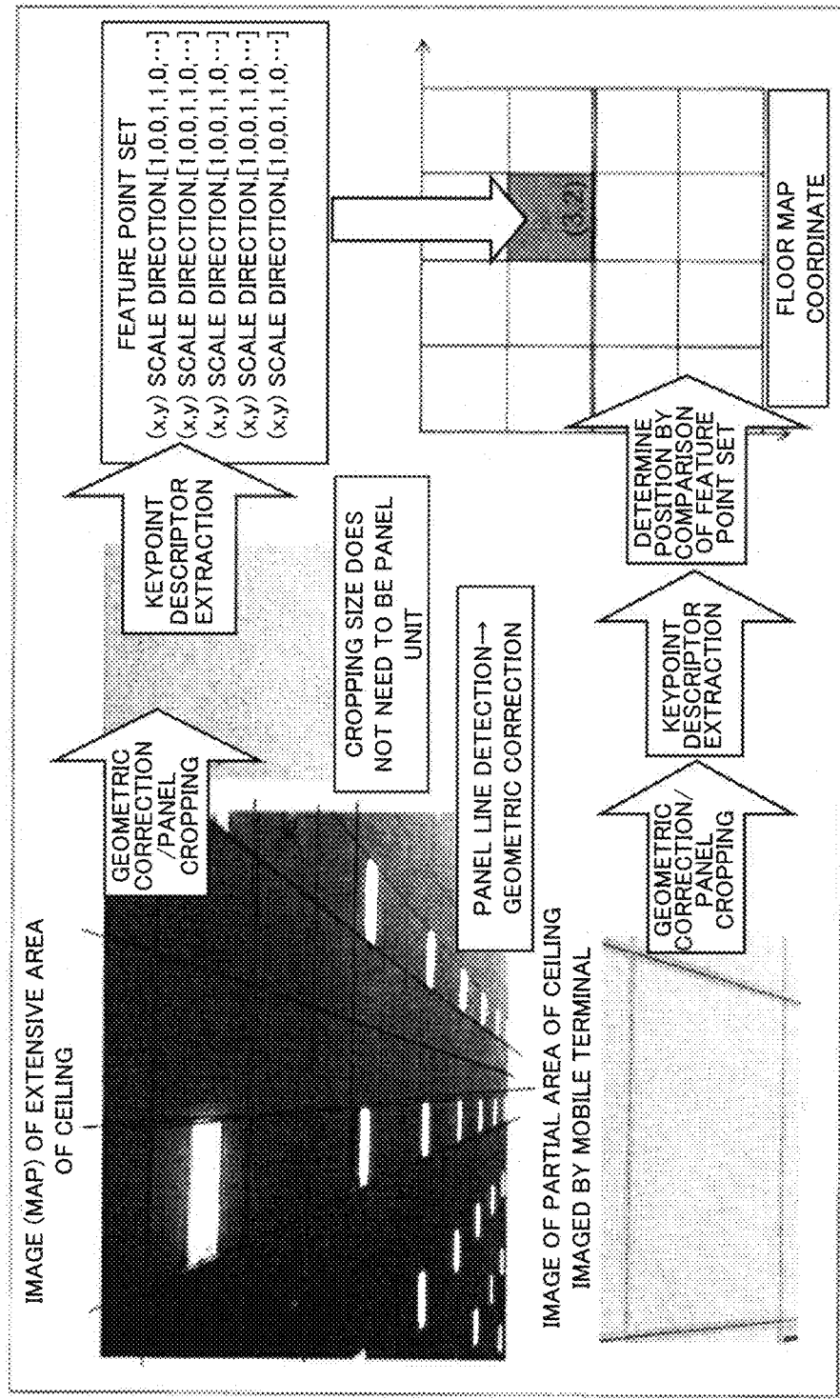
FIG. 5 is a diagram explaining a specific example of the comparison processes of the feature values.

In the following, descriptions are given with reference to FIG. 5 for the process executed in a case the image is cropped from the captured image for each panel of the ceiling and the feature point is obtained from the image, and matching is performed, as an example of the comparison process of the feature value.

The comparison unit 11 performs the geometric correction on the captured image of the extensive area of the ceiling and crops an image in a panel unit. The comparison unit 11 obtains information on each feature point with respect to an image of each panel (for example, panel position, scale, direction, and feature value (descriptor) of image pattern as to whether each pixel is black or white). The feature point having the scale, the direction, and the feature value can be obtained by use of a standard technique of the image processing. As an example, an SIFT feature value which implemented as function in open source software such as OpenCV or the like can be used. The comparison unit 11 performs the geometric correction on the image of the partial area of the ceiling which image is captured by the mobile terminal, crops the image in the panel range, obtains the feature point, and compares the feature point with a feature point set for each panel obtained from the image of the extensive area. Then, the comparison unit 11 determines a position of a panel of the feature point set having the highest degree of matching, as a position of an image of the partial area, which image is captured by the mobile terminal, in the captured image of the extensive area of the ceiling.

Information to be transmitted to notify the determined position of the mobile terminal may include any contents. In an example illustrated in FIG. 5, the comparison unit 11 may transmit, to a terminal, for example, the notification destination, a position of the determined panel (third panel in a right direction from a reference point and a second panel in a backward direction) together with the captured image (map) of the extensive area. The comparison unit 11 may transmit only the positional information of the determined panel. Further, the comparison unit 11 may generate and transmit an image obtained by superimposing a display on the captured image (map) of the extensive area such that a position of the mobile terminal is visible. The comparison unit 11 may generate an image in which an image of the partial area is displayed by a different expression in the captured image of the extensive area (for example, changing a color of a partial image area, displaying an outline of the area).

Further, in the processes of comparing the feature points, the comparison unit 11 may compare each feature point obtained from the captured image of a part of the ceiling or the floor with each feature point obtained from the captured image of the extensive area of the ceiling or the floor and find corresponding feature points (having the highest degree of similarity). In this case, it is possible to determine, as a position of an image captured by the mobile terminal, a region in the captured image of the extensive area of the ceiling or the floor where many (predetermined ratio or more) feature points corresponding to feature points obtained from the captured image of a part of the ceiling or the floor are included.

As described above, in the first example embodiment, when determining the user position by use of the image captured by the mobile terminal, correct comparison results can be obtained by executing image comparison using the random pattern (object fingerprint) of the ceiling or the floor, without depending on large features such as the blowout port of the air conditioner and the corner of the ceiling panel. Further, the position of the mobile terminal of an inquiry side can be determined by notifying a position of the partial ceiling image or floor image of the inquiry side on the image of the extensive area, without using a physical positional information.

Second Example Embodiment

A second example embodiment is described. The second example embodiment relates to a system for capturing an image of the partial area of the ceiling or the floor by each of two users using a mobile terminal, transmitting the image to the position determination device, comparing, using the position determination device, the captured image of the extensive area of the ceiling or the floor with the captured image received from each mobile terminal, and notifying a positional relationship between the mobile terminals of the two users.

Figure 6:
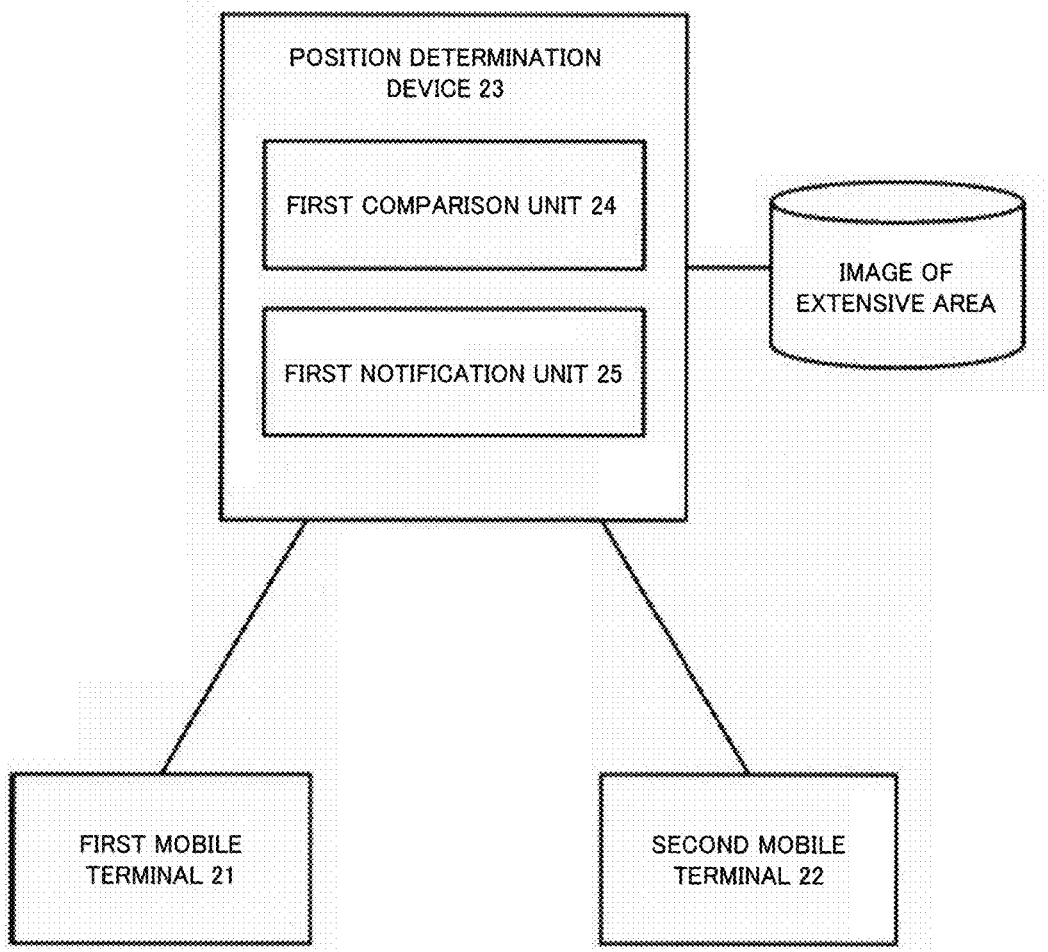
FIG. 6 is a block diagram of a second example embodiment.

FIG. 6 is a block diagram of the position determination system according to the second example embodiment. The position determination system according to the second example embodiment includes a first mobile terminal 21, a second mobile terminal 22, and a position determination device 23 which are connected via a communication network.

The first mobile terminal 21 and the second mobile terminal 22 are terminals that include an imaging unit, a communication unit, and a display unit and include a smartphone and a tablet.

The position determination device 23 is a server that includes a first comparison unit 24 and a first notification unit 25.

The first comparison unit 24 receives, from the first mobile terminal 21 and the second mobile terminal 22, the captured images of the partial areas of the ceiling or the floor respectively. The first comparison unit 24 compares image features of the received random pattern of each captured image with the image features of the random pattern of the captured image of an area of the ceiling or the floor more extensive than the partial area of the ceiling or the floor respectively, and determines positions of the captured images of the first mobile terminal 21 and the second mobile terminal 22, in the captured image of the extensive area. Processing of correcting the captured image, extracting the feature value from the image, and comparing the features values, performed by the first comparison unit 24 is similar to the processing in the first example embodiment. The captured image of the extensive area may be stored in a storage unit of the position determination device 23 or may be stored in other storage devices that can be connected to the position determination device 23.

The first notification unit 25 notifies the positional relationship between the first mobile terminal 21 and the second mobile terminal 22 based on the positions of the images determined by the first comparison unit 24, to at least one of the first mobile terminal 21 and the second mobile terminal 22.

Figure 7:
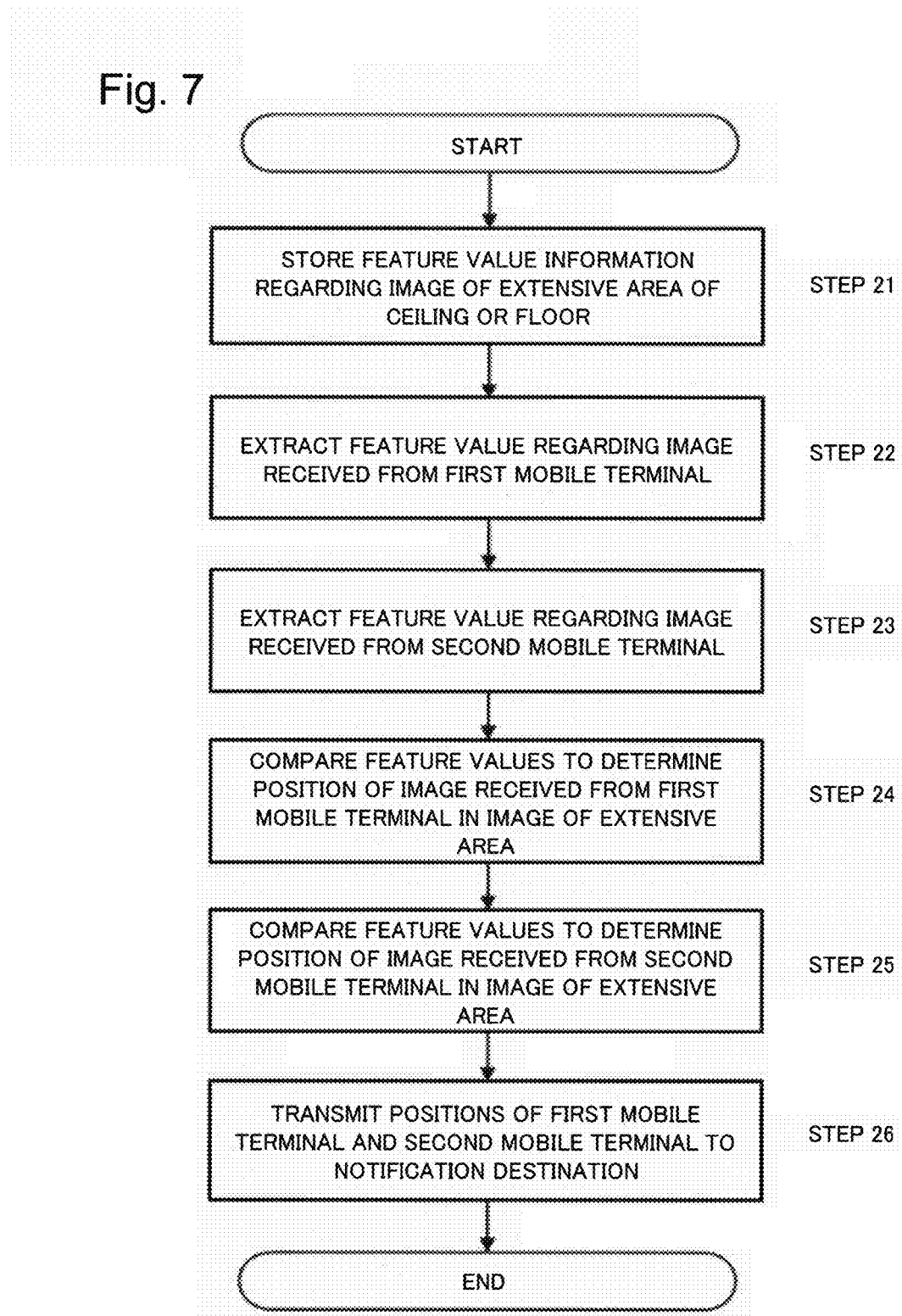
FIG. 7 is a flowchart for explaining processing operations in a position determination system according to the second example embodiment.

Processing operations in the position determination system according to the second example embodiment are described with reference to the flowchart of FIG. 7.

Examples of services for notifying a delivery person of a position of an orderer of a package at indoor, are explained. It is assumed that the orderer of the package has the first mobile terminal 21 and the delivery person of the package has the second mobile terminal 22.

The first comparison unit 24 performs, in advance, a geometric correction, the cropping of the image in a predetermined unit, and the extraction of the feature values, on the captured image of the extensive area of the ceiling or the floor and stores the feature value information (step 21).

The orderer of the package captures an image of the partial areas of the ceiling right above oneself or the partial areas of the floor right below oneself at a pin point using the first mobile terminal 21 and transmits the captured image to the position determination device 23. The delivery person of the package captures an image of the partial areas of the ceiling right above oneself or the partial areas of the floor right below oneself at a pin point using the second mobile terminal 22 and transmits the captured image to the position determination device 23.

When receiving the captured images of the partial area of the ceiling or the floor from the first mobile terminal 21 and the second mobile terminal 22, the first comparison unit 24 of the position determination device 23 executes, on the images, the geometric correction, cropping of the image, and the extraction of the feature value (steps 22 and 23).

The first comparison unit 24 compares the feature value obtained from the captured image received from the first mobile terminal 21 with the feature value obtained from the captured image of the extensive area of the ceiling or the floor, and determines a position of the captured image received from the first mobile terminal 21 in the captured image of the extensive area of the ceiling or the floor (step 24).

Further, the first comparison unit 24 compares the feature value obtained from the captured image received from the second mobile terminal 22 with the feature value obtained from the captured image of the extensive area of the ceiling or the floor, and determines a position of the captured image received from a second mobile terminal 21 in the captured image of the extensive area of the ceiling or the floor (step 25).

The first comparison unit 24 transmits, to the predetermined notification destination (in this example, the second mobile terminal), each position determined at steps 24 and 25, as the position of the first mobile terminal 21 and the position of the second mobile terminal 22 (step 26).

Figure 8:
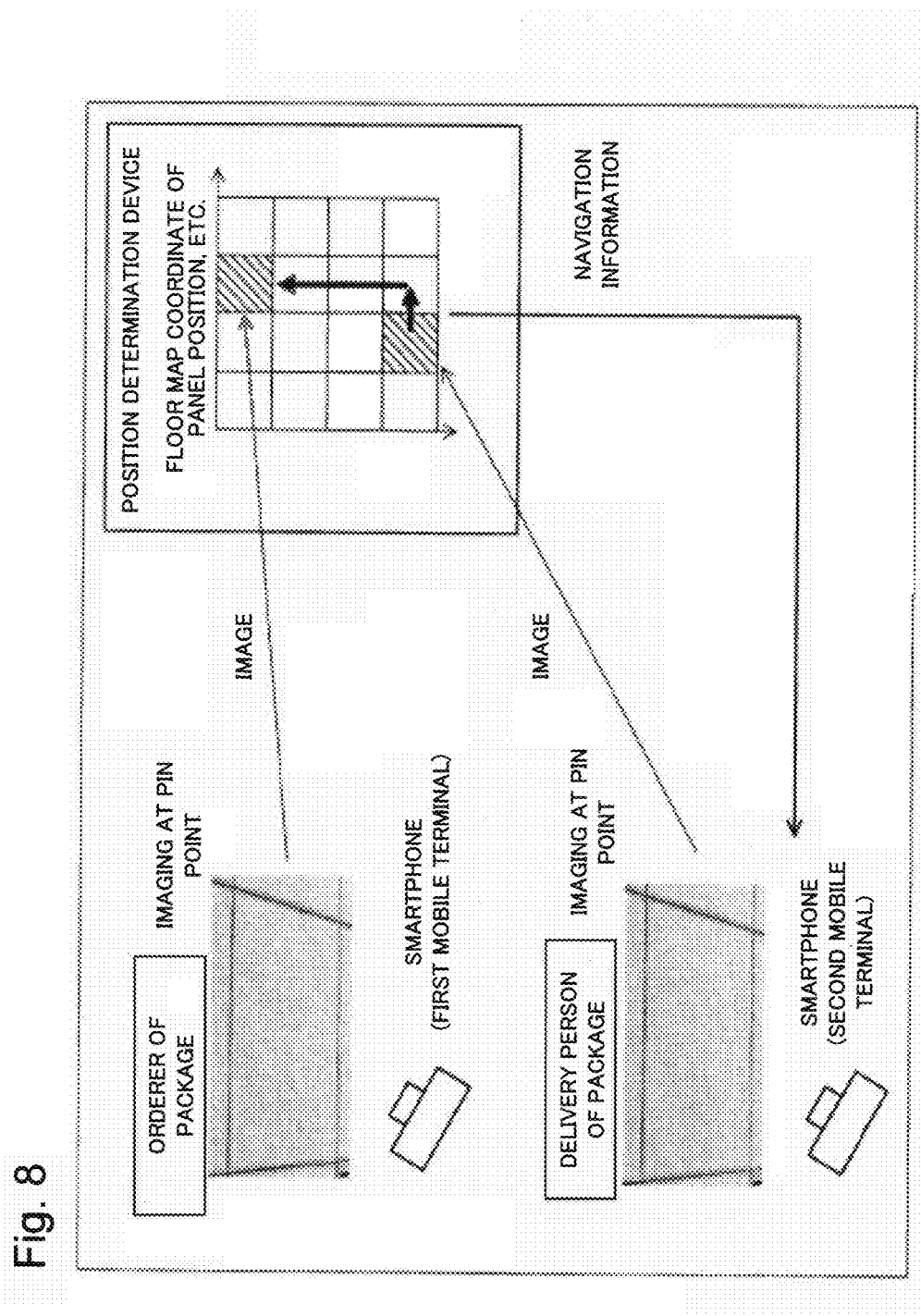
FIG. 8 is a diagram for explaining an example of notifying a determined position.

The position determination device 23 may, as illustrated in FIG. 8, for example, generate and transmit, to the delivery person (the second mobile terminal), navigation information indicating a shortest path from the position of the delivery person (the position of the second mobile terminal) to the position of the delivery destination (the position of the first mobile terminal) along the panels in the captured image of the extensive area of the ceiling or the floor.

Third Example Embodiment

A third example embodiment is described. The third example embodiment relates to a system for capturing an image of the partial area of the ceiling or the floor by one user using the mobile terminal and transmitting the captured image to the position determination device, capturing an image of the extensive area of the ceiling or the floor by another user using the mobile terminal and transmitting the captured image to the position determination device, comparing the captured images received from respective mobile terminal by the position determination device, and notifying the position of the mobile terminal of the one user.

Figure 9:
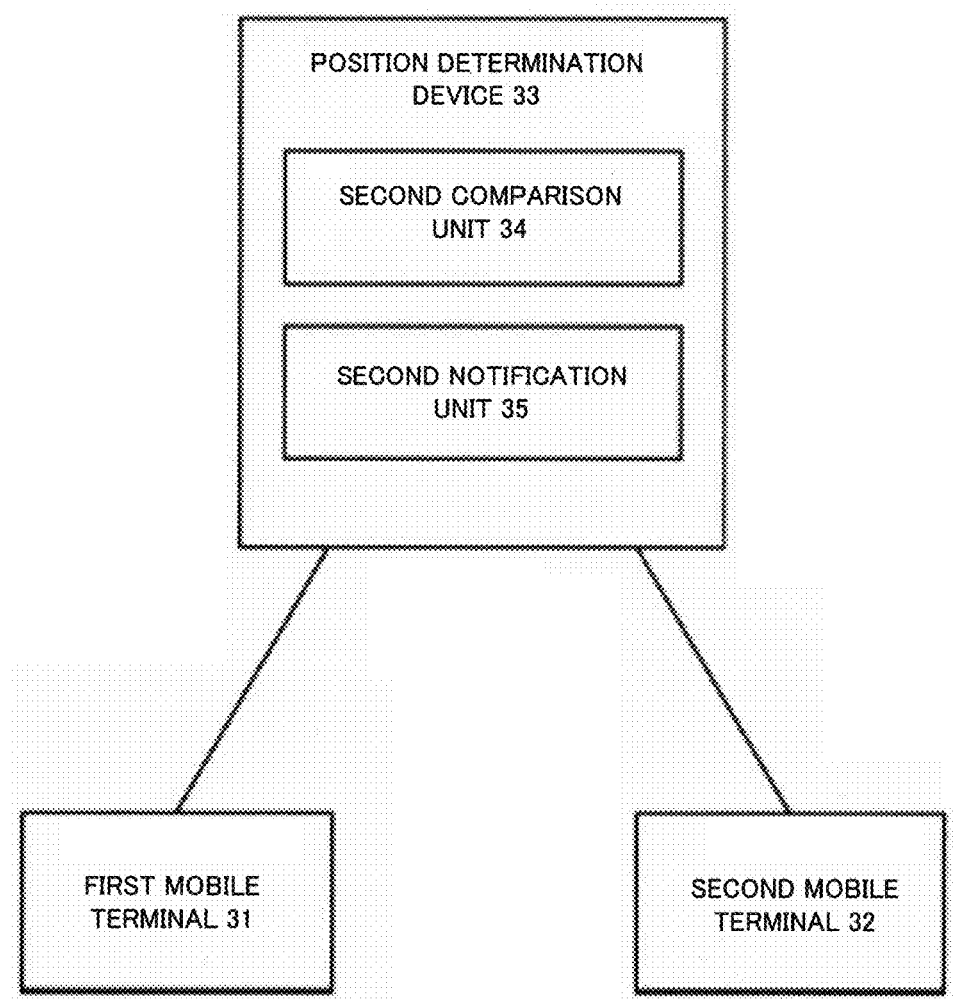
FIG. 9 is a block diagram of a third example embodiment.

FIG. 9 is a block diagram of the position determination system according to the third example embodiment. The position determination system according to the third example embodiment includes a first mobile terminal 31, a second mobile terminal 32, and a position determination device 33 which are connected via a communication network.

The first mobile terminal 31 and the second mobile terminal 32 are terminals that include an imaging unit such as a camera, a communication unit, and a display unit and include a smartphone and a tablet. Further, the first mobile terminal 31 and the second mobile terminal 32 include a memory and a CPU and perform various types of processing described later by executing a program stored in the memory.

The position determination device 33 is a server that includes a second comparison unit 34 and a second notification unit 35.

The second comparison unit 34 receives, from the first mobile terminal 31, the captured image of the partial area of the ceiling or the floor, and receives, from the second mobile terminal 32, the captured image of the area of the ceiling or the floor which area is more extensive than the partial area of the ceiling or the floor. The second comparison unit 34 compares the image features of the random patterns of the captured images received from the first mobile terminal 31 and the second mobile terminal 32 and determines the position of the captured image received from the first mobile terminal 31 in the captured image received from the second mobile terminal 32. Processing of correcting the captured image, extracting the feature values from the images, and comparing the feature value, performed by the second comparison unit 34 is similar to the processing in the first example embodiment. The second notification unit 35 notifies at least one of the first mobile terminal 31 and the second mobile terminal 32, the position of the first mobile terminal 31 based on the position determined by the second comparison unit 34.

Figure 10:
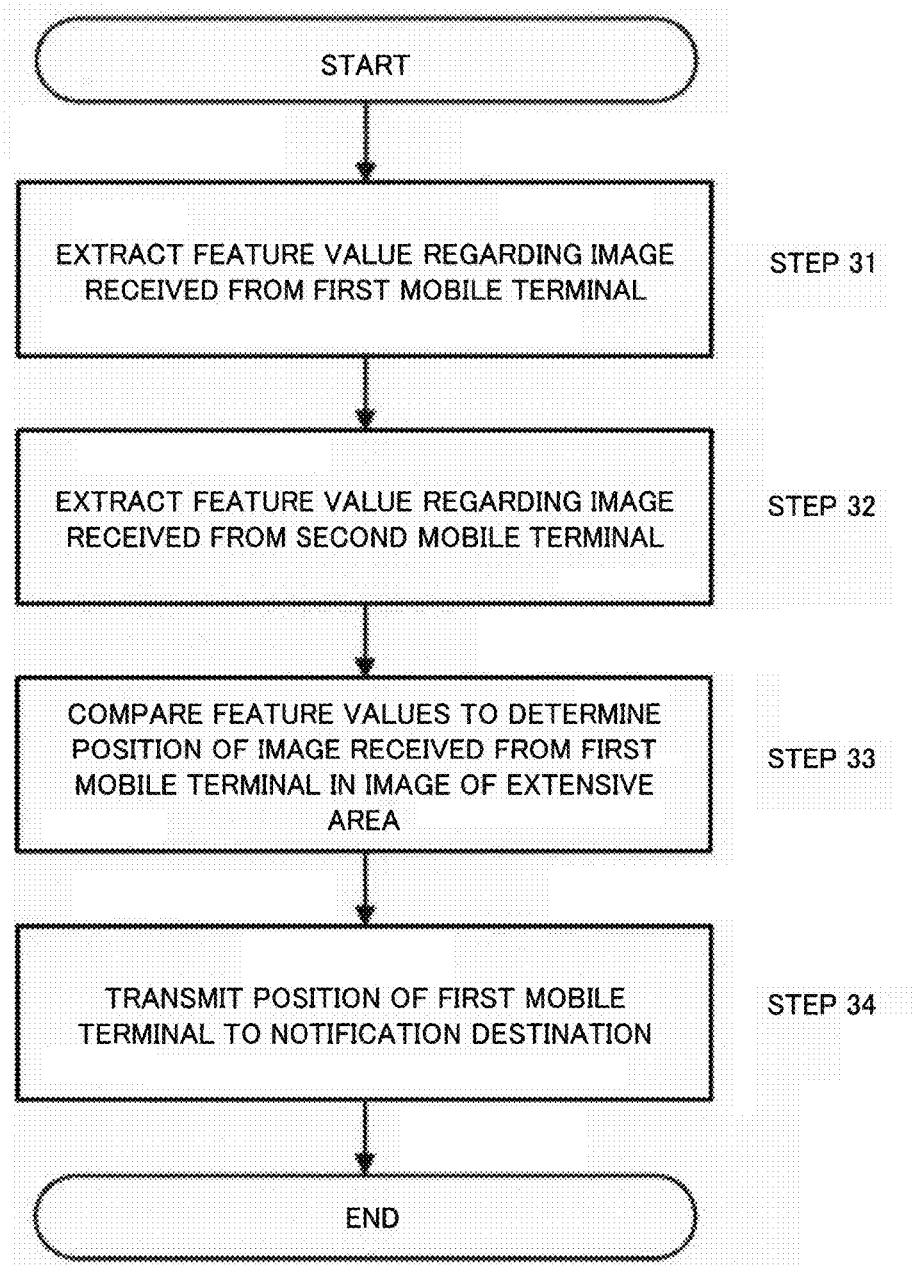
FIG. 10 is a flowchart for explaining processing operations in a position determination system according to the third example embodiment.

Processes in the position determination system according to the third example embodiment are described with reference to the flowchart of FIG. 10. A service of notifying a delivery person a position of an orderer of a package at indoor is explained as an example for description. It is assumed that the orderer of the package has the first mobile terminal 31 and the delivery person of the package has the second mobile terminal 32.

The orderer of the package uses the first mobile terminal 31 to capture an image of the partial area of the ceiling right above oneself or the floor right below oneself at a pin point and transmits the captured image to the position determination device 33. The delivery person of the package uses the second mobile terminal 32 to capture an image of the extensive area of the ceiling or the floor and transmits the captured image to the position determination device 33.

When receiving the captured images from the first mobile terminal 31 and the second mobile terminal 32, the second comparison unit 34 execute, on the respective captured images, the geometric correction process, cropping process of the image, and the extraction process of the feature value (steps 31 and 32).

The second comparison unit 34 compares the feature values obtained from the captured image received from the first mobile terminal 31 with the feature values obtained from the captured image received from the second mobile terminal 32, and determines the position of the captured image received from the first mobile terminal 31 in the captured image of the extensive area of the ceiling or the floor (step 33).

The second notification unit 35 transmits, to the predetermined notification destination (in this example, the second mobile terminal), the position determined at step 33 as the position of a first mobile terminal 21 (step 34).

Figure 11:
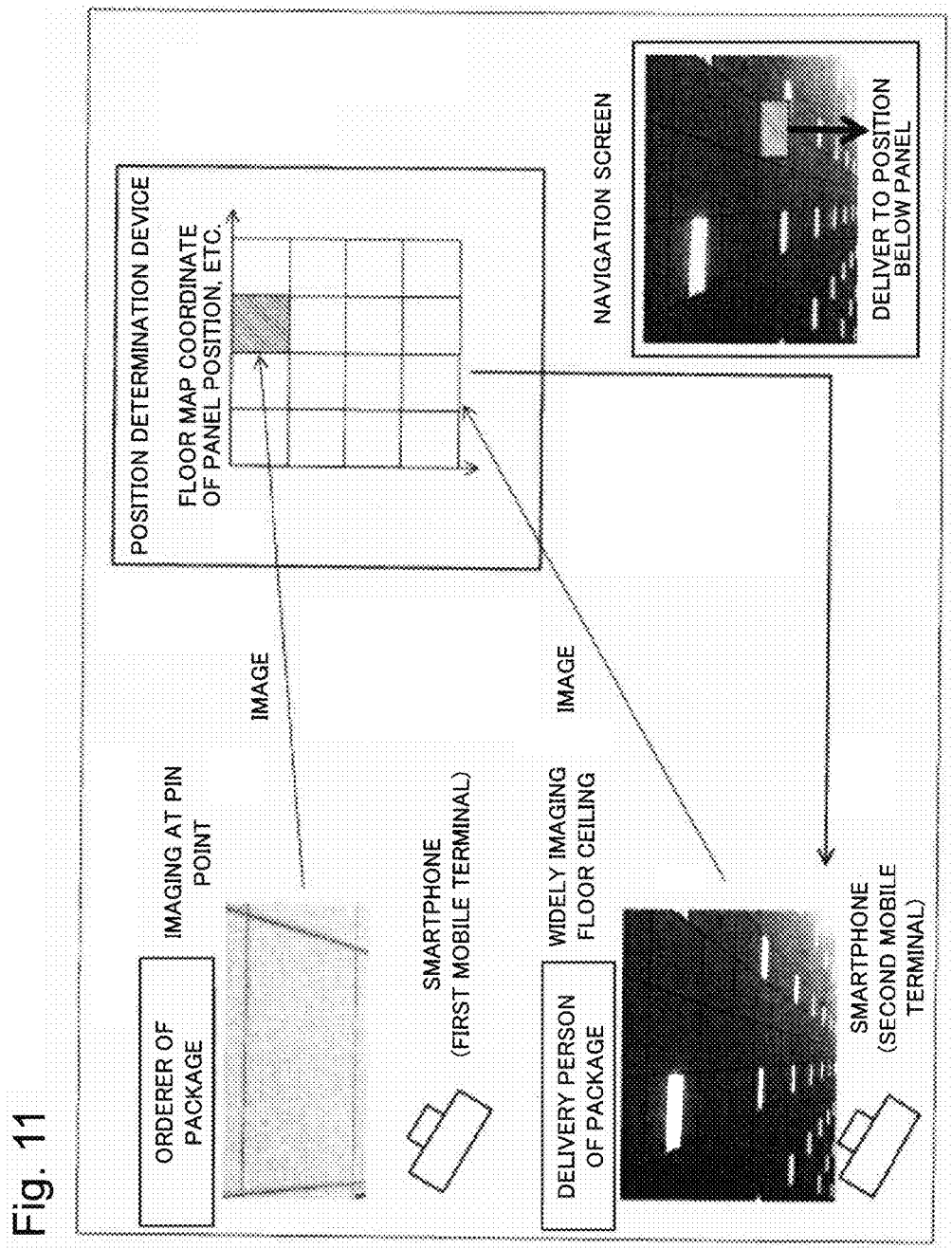
FIG. 11 is a diagram for explaining an example of notifying a determined position.

The position determination device 33 may, as illustrated in FIG. 11, for example, generate and transmit, to the delivery person (second mobile terminal), a navigation screen showing the position of the delivery destination (position of first mobile terminal) on the image captured by the delivery person.

Figure 12:
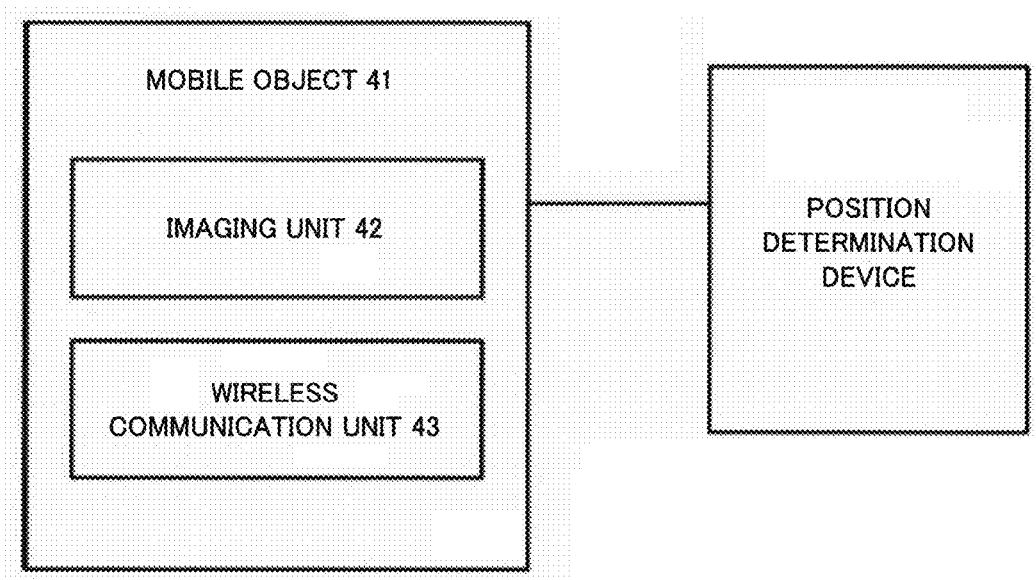
FIG. 12 is a block diagram of a mobile object.

In the first and second example embodiments, the mobile object having the imaging unit may obtain the captured image of the extensive area of the ceiling or the floor while moving. FIG. 12 exemplifies a configuration of the mobile object. A mobile object 41 includes an imaging unit 42 and a wireless communication unit 43 and is connected to the position determination device via a communication network such as the wireless communication. The mobile object 41 may be, for example, a UAV (Unmanned Aerial Vehicle) and a robot. The mobile object may widely capture an image of the extensive area of the ceiling or the floor using a high-resolution camera and transmit the image to the position determination device. Further, the mobile object may capture a plurality of images of a plurality of divided areas of the extensive area of the ceiling or the floor and transmit the images to the position determination device, and then the position determination device may combine the plurality of images to generate the captured image of the extensive area. Further, the mobile object may combine a plurality of captured images of a plurality of divided areas of the extensive area of the ceiling or the floor and transmit the combined image to the position determination device.

Figure 13:
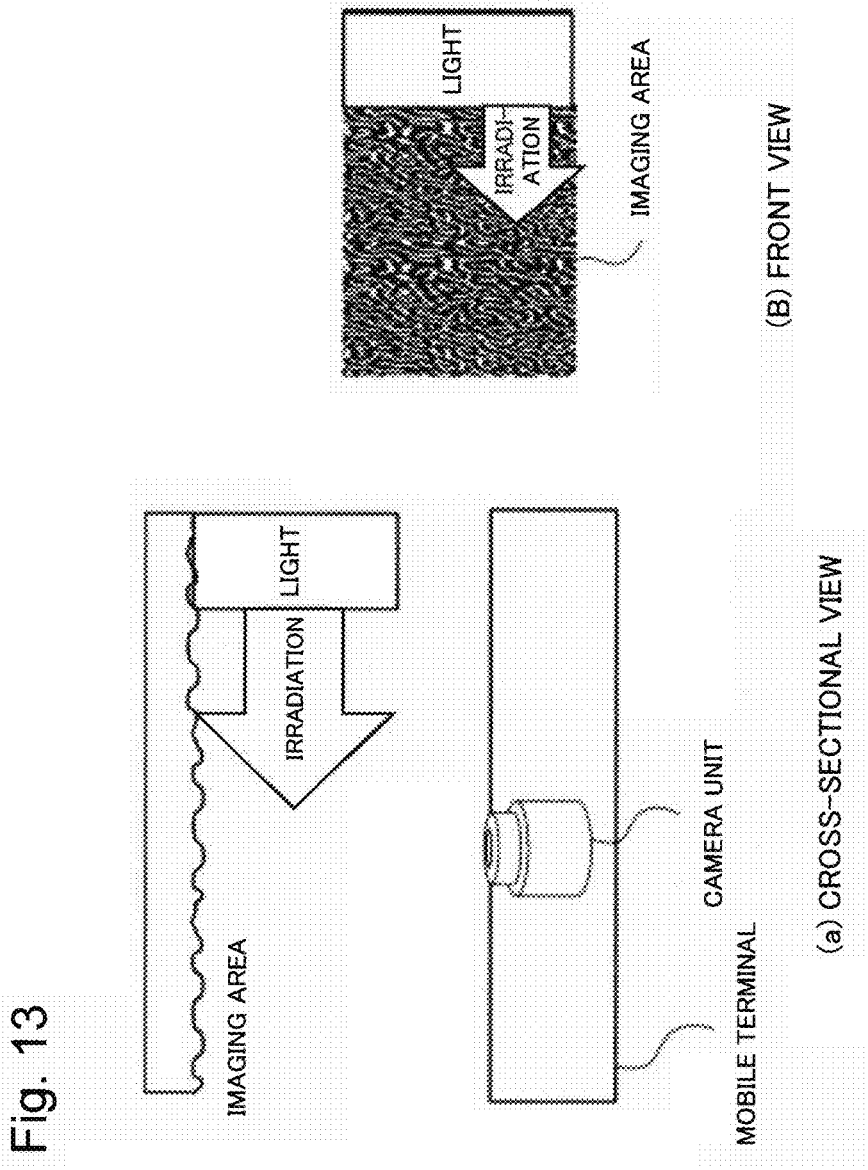
FIG. 13 is a diagram for explaining an example of capturing an image of the ceiling by also using illumination means.

Further, in each example embodiment described above, at the ceiling provided with the indirect lighting or the like, as illustrated in FIG. 13, a light source such as a commercially available LED light is brought into close contact to the ceiling or the floor such that an irradiation direction of light is parallel to an imaging area of the ceiling or the floor, and then an image of the imaging area may be captured using the mobile terminal. With this configuration, even if an operator does not have a special knowledge, the operator can capture images, which have high contrasts of the imaging area, with simple operations.

In each example embodiment described above, the mobile terminal may add, to the captured image of the ceiling or the floor, memo data input by a user and then transmit the resultant captured image to the position determination device. The position determination device may generate an image obtained by superimposing the memo data to the captured image and then transmit the image to the notification destination, for example, the mobile terminal. Further, the user may designate a user attribute (ID or the like) of an object to whom the user intends to show the memo. The position determination device compares the designated user attribute with a user attribute of the notification destination, and when the user attributes match with each other, the memo data may be transmitted together with the captured image.

The present invention may be applied to a system for controlling the equipment and the inventory. In each example embodiment described above, when the equipment or the like is placed in a store building, an ID of the object and the captured image of the partial area of the ceiling or the floor may be transmitted, from the mobile terminal, to the position determination device. The position determination device determines a position of the equipment on the captured image of the extensive area and stores the position together with the ID of the object to enable linking the ID of the equipment to the random pattern (object fingerprint) of the ceiling.

The present invention may be applied to a system of delivering a mail to a user in a room using the mobile object such as a UAV. Any example embodiments described above may be applied to this case. The mobile terminal of the user, for example, the delivery destination corresponds to the mobile terminal whose position is determined in each example embodiment described above and the UAV corresponds to a mobile terminal to which the determined position of the mobile terminal is notified. The position determination device determines the position of the mobile terminal of the user on the captured image of the extensive area, from the captured image of the partial area of the ceiling or the floor received from the mobile terminal of the user, for example, the delivery destination and notifies the UAV, for example, the predetermined notification destination, the determined position. The UAV moves to the position.

The present invention may be applied to a mobile object such as a robot cleaner including an imaging unit and a communication unit. Any example embodiments described above may be applied to this case. In this case, the robot cleaners correspond to both the mobile terminal whose position is determined in each example embodiment described above and the mobile terminal to which the determined position is notified. For example, the robot cleaner transmits the captured image of the partial area of the ceiling or the like to the position determination device. The position determination device determines the position of the robot cleaner in the captured image of the extensive area and notifies the determined position to the robot cleaner. The robot cleaner may obtain information on a self-position on the floor and store the information so as to find an uncleaned area (unmoved area). Further, the robot cleaner may have a function and a configuration of the position determination device to perform a process of determining the self-position by oneself.

As evident from descriptions above, each unit can be configured from a hardware and also can be realized by a computer program. In this case, functions and operations which are the same as those in the example embodiments described above are realized by a processor which operates based on a program stored in the program memory.

Figure 14:
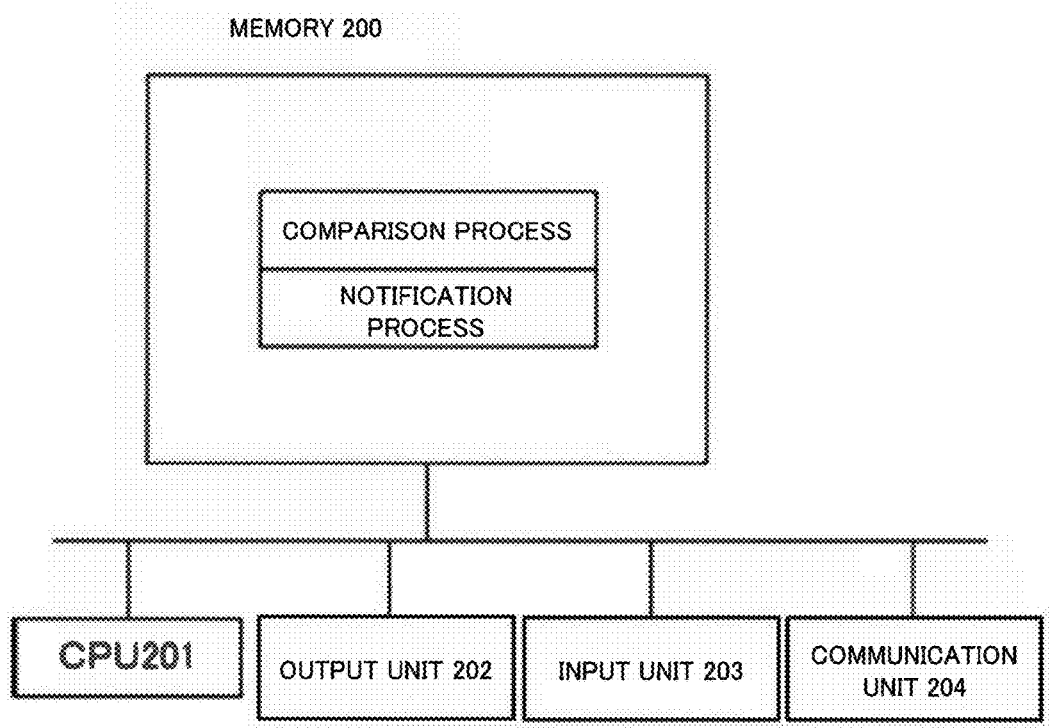
FIG. 14 is a diagram illustrating an example of a computer operated by a program.
Figure 15:
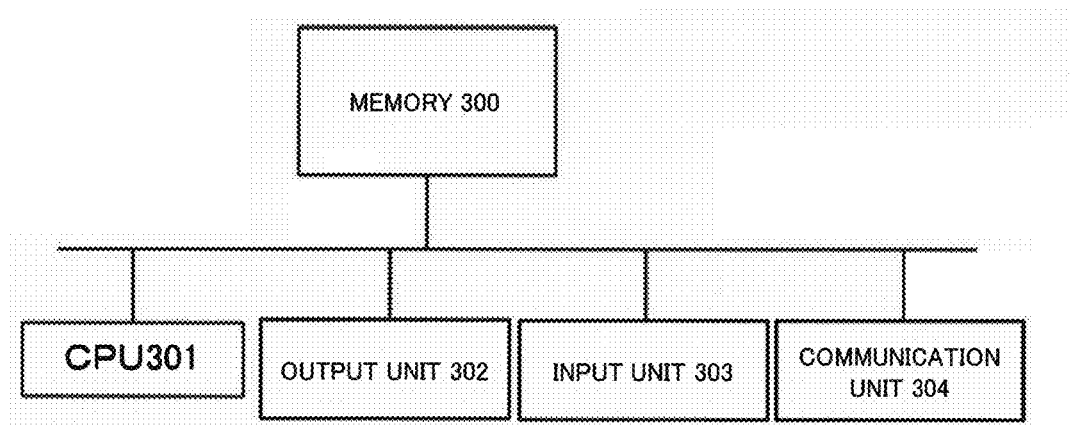
FIG. 15 is a diagram illustrating an example of a computer operated by a program.

Specifically, as exemplified in FIG. 14, each unit can be realized by a computer configured from a memory 200, a CPU 201, an output unit 202, an input unit 203, and a communication unit 204. In this case, the memory 200 stores a program that executes a process corresponding to the process of each unit in the position determination devices 10, 23, and 33 described above. The CPU 201 executes the program stored in the memory 200 so that a function of each unit described above is realized. A comparison image can be input and received via the input unit 203 and the communication unit 204. Further, the comparison result can be output to the output unit 202 (for example, display or the like) and transmitted to an external terminal via the communication unit 204. The mobile object including the UAV, the robot cleaner or the like described above can be realized by a computer including a memory, a CPU, and a communication unit. As exemplified in FIG. 15, each unit can be realized by a computer including a memory 300, a CPU 301, an output unit 302, an input unit 303, and a communication unit 304. The CPU 301 executes a program stored in the memory 300 so that various types of processes described above are performed.

A part or the whole of example embodiments described above may be described as following supplementary notes, but is not limited thereto.

The present invention has been described by taking preferable example embodiments above, but the present invention is not necessarily limited to the above example embodiments, and can be changed and implemented in various ways within a range of a technical idea.

This application claims priority based on Japanese Patent Application No. 2015-080629 filed on Apr. 10, 2015, the disclosure of which is incorporated herein in its entirety.

REFERENCE SIGNS LIST

10, 23, 33 Position determination device
11 Comparison unit
24 First comparison unit
25 First notification unit
34 Second comparison unit
35 Second notification unit
21, 31 First mobile terminal
22, 32 Second mobile terminal
41 Mobile object
42 Imaging unit
43 Wireless communication unit
200, 300 Memory
201, 301 CPU
202, 302 Output unit
203, 303 Input unit
204, 304 Communication unit

The invention claimed is:

1. A position determining method comprising:
   comparing a random pattern of an image of a partial area of a ceiling or a floor, the image being captured by a mobile terminal, with a random pattern of an image of an extensive area of the ceiling or the floor, the extensive area of the ceiling or the floor being more wider than the partial area of the ceiling or the floor;
   determining a position of the image of the partial area in the image of the extensive area;
   determining the position on the ceiling above the mobile terminal or the position on the floor below the mobile terminal based on the determined position on the image of the extensive area;
   obtaining, in advance, the random pattern of the image of the extensive area of the ceiling or the floor more wider than the partial area of the ceiling or the floor;
   when receiving the images of the partial area of the ceiling or the floor from a first mobile terminal and a second mobile terminal respectively,
   comparing the image feature of the random pattern of the image begin received with the image feature of the random pattern of the image of the extensive area of the ceiling or the floor;
   determining a position of the image of the first mobile terminal and a position of the image of the second mobile terminal on the image of the extensive area; and
   notifying a positional relationship between the first mobile terminal and the second mobile terminal based on the position being determined, to at least one of the first mobile terminal and the second mobile terminal.

2. A position determining method comprising:
   comparing a random pattern of an image of a partial area of a ceiling or a floor, the image being captured by a mobile terminal, with a random pattern of an image of an extensive area of the ceiling or the floor, the extensive area of the ceiling or the floor being more wider than the partial area of the ceiling or the floor;
   determining a position of the image of the partial area in the image of the extensive area;
   determining the position on the ceiling above the mobile terminal or the position on the floor below the mobile terminal based on the determined position on the image of the extensive area;
   when receiving, from the first mobile terminal, the image of the partial area of the ceiling or the floor and, receiving, from the second mobile terminal, the image of the extensive area of the ceiling or the floor more wider than the partial area of the ceiling or the floor,
   comparing the image feature of the random pattern of the image received from the first mobile terminal with the image feature of the random pattern the second mobile terminal;
   determining the position of the image received from the first mobile terminal in the image received from the second mobile terminal; and
   notifying the position of the first mobile terminal based on the position being determined, to at least one of the first mobile terminal and the second mobile terminal.

* * * * *